United States Patent [19]

Pattavina et al.

[11] Patent Number: 4,768,192
[45] Date of Patent: Aug. 30, 1988

[54] FRAME SYNCHRONIZATION DETECTION SYSTEM FOR TIME DIVISION MULTIPLEXED (TDM) DIGITAL SIGNALS

[75] Inventors: Jeffrey S. Pattavina, Billerica; Jai H. Eu, Westford, both of Mass.

[73] Assignee: General Signal Corp., N.Y.

[21] Appl. No.: 33,551

[22] Filed: Apr. 1, 1987

[51] Int. Cl.$^4$ .............................................. H04J 3/06
[52] U.S. Cl. .................................... 370/100; 370/106; 375/116
[58] Field of Search ............... 370/100, 106, 105, 107; 375/114, 116; 371/42, 46

[56] References Cited

U.S. PATENT DOCUMENTS

| | | | |
|---|---|---|---|
| 3,537,069 | 10/1970 | Van de Houten | 371/47 |
| 3,596,245 | 7/1971 | Finnie | 371/47 |
| 3,742,139 | 6/1973 | Boehly | 375/118 |
| 3,854,011 | 10/1974 | Mallory | 370/105 |
| 3,928,726 | 12/1975 | Colton et al. | 370/105 |
| 3,995,119 | 11/1976 | Pachynski, Jr. | 370/112 |
| 4,016,368 | 4/1977 | Apple | 370/105 |
| 4,027,243 | 5/1977 | Stackhouse et al. | 375/114 |
| 4,154,984 | 5/1979 | Murasov | 370/105 |
| 4,271,520 | 6/1981 | Coombes | 371/42 |
| 4,301,534 | 11/1981 | Genter | 370/105 |
| 4,312,070 | 1/1982 | Coombes | 371/40 |
| 4,317,202 | 2/1982 | Markwitz | 371/43 |
| 4,507,779 | 3/1985 | Barner | 370/100 |
| 4,541,104 | 9/1985 | Hirosaki | 375/114 |
| 4,554,540 | 11/1985 | Mori et al. | 375/116 |
| 4,605,921 | 8/1986 | Riddle | 340/347 DD |
| 4,622,666 | 11/1986 | Graves | 370/100 |

OTHER PUBLICATIONS

Transmission Systems for Communications By Bell Laboratories, Inc. (1982), pp. 591–596, 659–668, 675–686, 743–744.
R8070 T-1/cept, PCM Transceiver Designers Guide, Rockwell Intl, Jul. 1984, pp. 4-1 to 4-3.
Dodds, IEEE Trans Comm, Com-33, 5, May 1985, 465.

*Primary Examiner*—Robert L. Griffin
*Assistant Examiner*—Stephen Chin
*Attorney, Agent, or Firm*—Martin LuKacher

[57] ABSTRACT

A frame synchronization detection system which enables frame synchronization and synchronizing pulses to be provided from at least two formats of DS1 TDM signals, specifically the D4 and extended superframe Fe formats. A first search logic circuit provides an output indicating the onset of a maintenance mode of frame detection when either Fe or D4 patterns are decoded. For the D4 pattern an alternate pattern is decoded and the first search circuit enters the maintenance mode only after both alternate D4 framing patterns are decoded. A second search logic circuit enables the decoding of a subsequent sequence and detection of framing, thereby reducing the probability of false framing. A frame counter which is synchronized upon the detection of a valid framing pattern by the first search circuit continues to supply frame sync pulses until an error detector, which detects whether a predetermined ratio of invalid to valid framing bits occurs, resets the system back to the search mode.

13 Claims, 5 Drawing Sheets

| SFR. NO. | FRAME NO. | | | VALID FRAME PATTERNS | | | TAP NO. |
|---|---|---|---|---|---|---|---|
| | EXT FRAME (Fe) | D4 ALT=0 | D4 ALT=1 | Fe | D4A0 | D4A1 | |
| 1 | 8 | 8A | 10A | 0 | 1 | 1 | 1 |
| | 12 | 12A | 2B | 1 | 0 | 0 | 2 |
| | 16 | 4B | 6B | 0 | 0 | 1 | 3 |
| | 20 | 8B | 10B | 1 | 1 | 1 | 4 |
| | 24 | 12B | 2A | 1 | 0 | 0 | 5 |
| 2 | 4 | 4A | 6A | 0 | 0 | 1 | 6 |
| | 8 | 8A | 10A | 0 | 1 | 1 | 7 |
| | 12 | 12A | 2B | 1 | 0 | 0 | 8 |
| | 16 | 4B | 6B | 0 | 0 | 1 | 9 |
| | 20 | 8B | 10B | 1 | 1 | 1 | 10 |
| | 24 | 12B | 2A | 1 | 0 | 0 | 11 |
| 3 | 4 | 4A | 6A | 0 | 0 | 1 | 12 |
| | 8 | 8A | 10A | 0 | 1 | 1 | 13 |
| | 12 | 12A | 2B | 1 | 0 | 0 | 14 |
| | 16 | 4B | 6B | 0 | 0 | 1 | 15 |
| | 20 | 8B | 10B | 1 | 1 | 1 | 16 |
| | 24 | 12B | 2A | 1 | 0 | 0 | 17 |

*FIG. 2*

FRAME SYNCHRONIZATION DETECTION SYSTEM FOR TIME DIVISION MULTIPLEXED (TDM) DIGITAL SIGNALS

DESCRIPTION

The present invention relates to frame synchronization detection systems for time division multiplexed signals, and particularly to a frame synchronization system which is capable of detecting synchronization from time division multiplex transmissions in a plurality of frame formats.

The invention is especially suitable for use in the framer circuit of an interface unit for network channel office equipment (NCOE) which receives, monitors and transmits a DS1 time division multiplex (TDM) signal. Such signals are sometimes called DS1 carrier signals. The system will also find other applications where ever framing of transmissions in a plurality of formats is desired using a single device rather than separate devices designed for each format.

Since framing and the detection of framing signals is essential for the decoding of TDM transmissions, various frame synchronization detection circuits have been proposed and are presently in use. These circuits sometimes use combinations of random access memories (RAM), counters and latches to develop long strings of bits from which framing patterns can be detected. Reference may be had to the text "Transmission Systems for Communications" 5th Edition, published by the Bell Telephone Laboratories Technical Staff (1982) § 28.3 for a general discussion of framing, framing patterns and the detection thereof. The use of RAM counter and latch combinations together with other devices for frame synchronization purposes may also be found in an article by D. E. Dodds entitled "Robust Frame Synchronization for Noisy PCM Systems", IEEE Transactions on Communications, Vol. COM-33 No. 5, May 1985, p. 465 and U.S. Pat. No. 4,622,666 issued Nov. 11, 1986 to which reference may be had for further information with respect to frame synchronization systems using RAMs, counters, latches and associated hardware.

None of the systems for frame synchronization which have heretofore been proposed have the capability of frame synchronization of TDM signals which are transmitted in a plurality of formats, and particularly in a single device which may be implemented in an integrated circuit chip or chips. Notwithstanding that a plurality of frame formats is to be detected simultaneously and in parallel, the requirements for rapid acquisition of framing, for example within 50 milliseconds (ms) on average and the low probability of false framing remain.

It has been discovered, in accordance with the present invention, that certain frame formats contain common characteristics with others so that both frame formats can be decoded from a common sequence of bits derived from the TDM signals. More particularly, it has been discovered that the D4 frame format can be broken down into two alternate frame patterns each of which have the same number of bits as the extended frame (Fe) format. A common sequencer can then be used to present sequences of bits which contain both frame patterns. The D4 pattern can be detected upon detection of both alternate patterns and the Fe format can be detected from one of the patterns. A plurality of bits which contain repetitions of the patterns may be presented by a sequencer during a first search for the patterns to provide a high confidence that false framing will not be detected. Still higher confidence of the absence of false framing can be provided by the use of a second search which presents a subsequent group of frames for the detection of the framing patterns. Since a single sequencer is used to present the bits containing the framing patterns, frame acquisition can occur in a short period of time (e.g., 15.6 ms) well within the allowable average time needed for network channel office equipment and with a low probability of false framing.

Accordingly it is the principal object of the present invention to provide an improved system for frame synchronization which enables frame synchronization to be detected regardless of whether the framing information is contained in any of a plurality of frame formats.

It is a still further object of the present invention to provide an improved frame synchronization system which may be implemented utilizing a single sequencer which presents repetitive sequences of the bits of a TDM transmission (e.g. a DS1 carrier) so as to enable acquisition of framing from framing bits arranged in any of a plurality of different frame formats.

It is a still further object of the present invention to provide an improved frame synchronization system which is capable of decoding frame synchronization information which is carried in a plurality of frame formats and provide frame synchronization signals with a low probability of false framing and within a frame acquisition time allowed by network transmission specifications.

Briefly described, a system for detecting frame synchronizing signals in accordance with the invention derives the signals from the framing bits in any of a plurality of framing formats of time division multiplex (TDM) digital signals. The system utilizes the discovery that certain frame formats can be divided into subpatterns which share the bit spacing of other frame formats. In a preferred embodiment of the invention, these formats are the extended superframe (Fe) and the D4 formats of the DS1 carrier transmission. There, the bit spacing of both subpatterns (alternate patterns) of the D4 format corresponds to the bit spacing of the Fe format, specifically 772 bits or 4 frames. Accordingly, the frame synchronization system provided by the invention utilizes means for providing, from the TDM signals, sequences of bits which are spaced apart by a predetermined multiple of the number of bits in a frame. In the specific DS1, Fe/D4 formats the predetermined multiple is 4 and the number of bits in a frame is 193 for a total of 772 bits. The sequencer for implementing such sequencing means is preferably a RAM-counter/latch combination. It may, however, be a shift register, since the combination is equivalent to a shift register having a tap spacing of the requisite number of bits. The system further includes means operative for decoding the sequences in parallel to derive outputs when the sequences correspond to the certain framing bit patterns. In the event that a D4 pattern is detected, the output is not provided until both subpatterns are decoded from the same sequence. The outputs resulting from the decoding are used to provide frame synchronization signals, as by synchronizing a frame counter which divides by 193 in the case of the DS1 carrier transmission.

In order to provide a high confidence of the absence of false framing, the sequence from which the framing patterns is detected is desirably long enough to reduce the probability of errors to the desired extent. The search for the valid frame patterns may be conducted as a first search followed by a second search thereby still further increasing the number of bits which are examined for the presence of valid framing pattens and still further reducing the probability of false framing.

An error detector which compares the sync bits with data bits in the frame sync bit positions may be used to detect an out-of-frame condition, when the ratio of invalid framing bits to valid framing bits exceeds a predetermined level, (e.g. three out of five) once the system is in the frame mode. Then, the system reverts back to search mode and frame search is reinitiated.

The foregoing and other objects, features and advantages of the invention, as well as a presently preferred embodiment thereof, will become more apparent from a reading of the following description in connection with the accompanying drawings in which:

FIG. 2 is a table illustrating the frame formats for the D4 and Fe frame structures of the DS1 carrier transmission, the positions of the bits which are examined to determine the presence of valid frame patterns for both Fe and D4 formats, and the taps on the sequencer where a sequence of these bits can appear;

Figure 1:
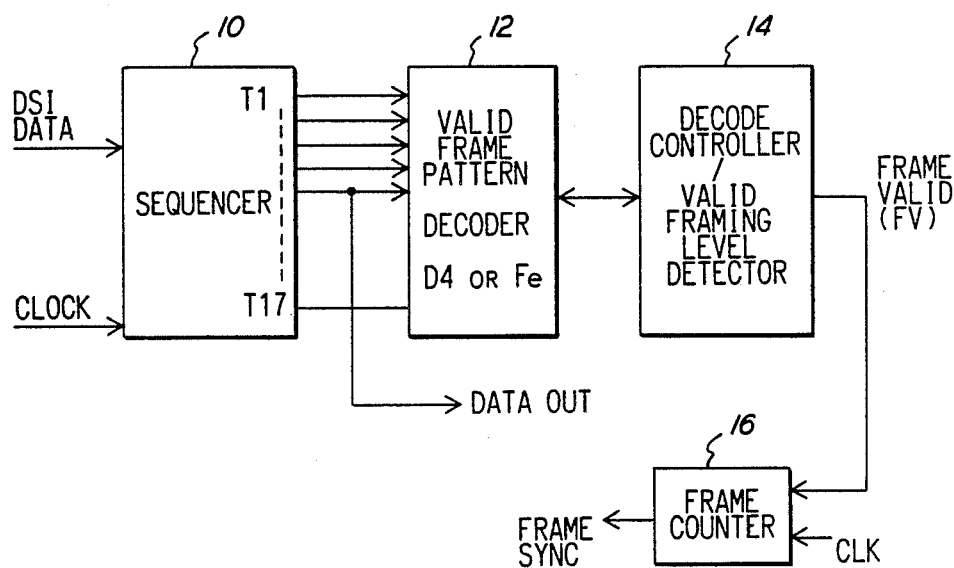
FIG. 1 is a simplified block diagram of a frame synchronization system embodying the invention.
Figure 3A:
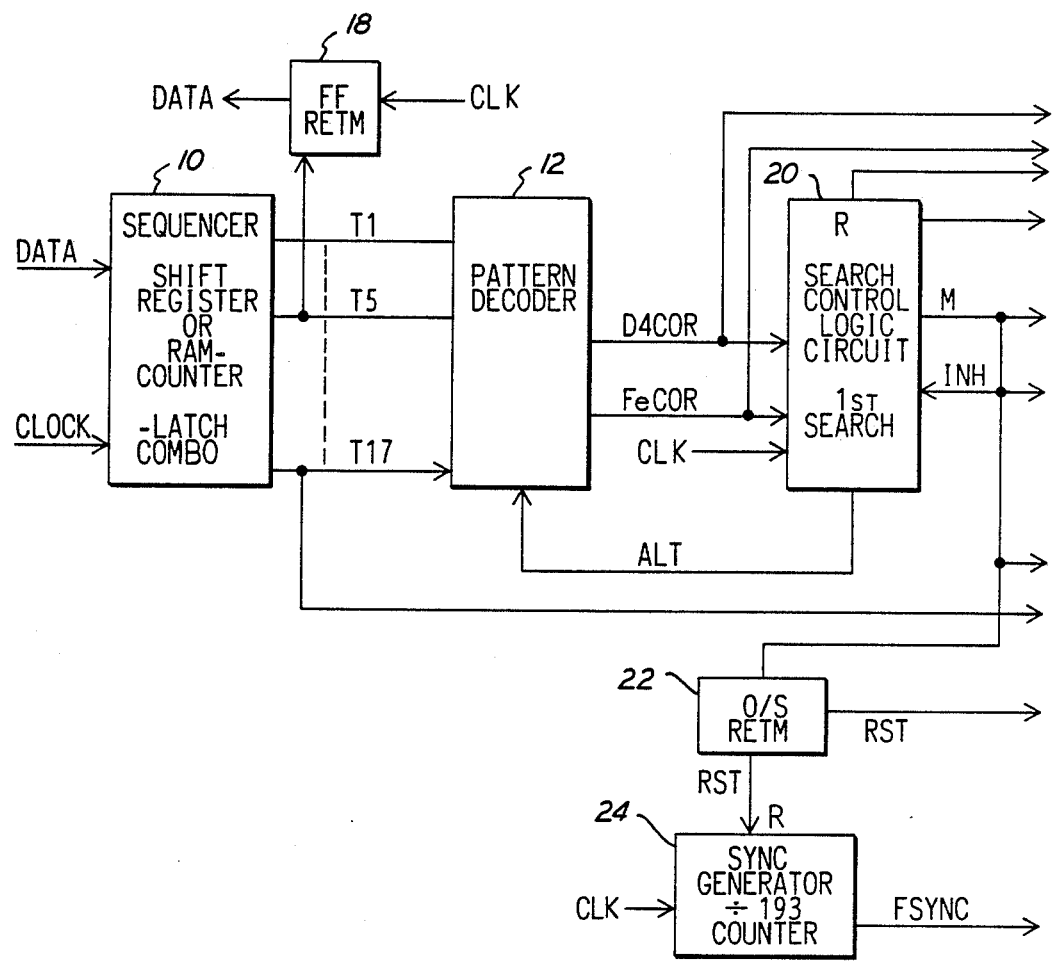
Figure 3B:
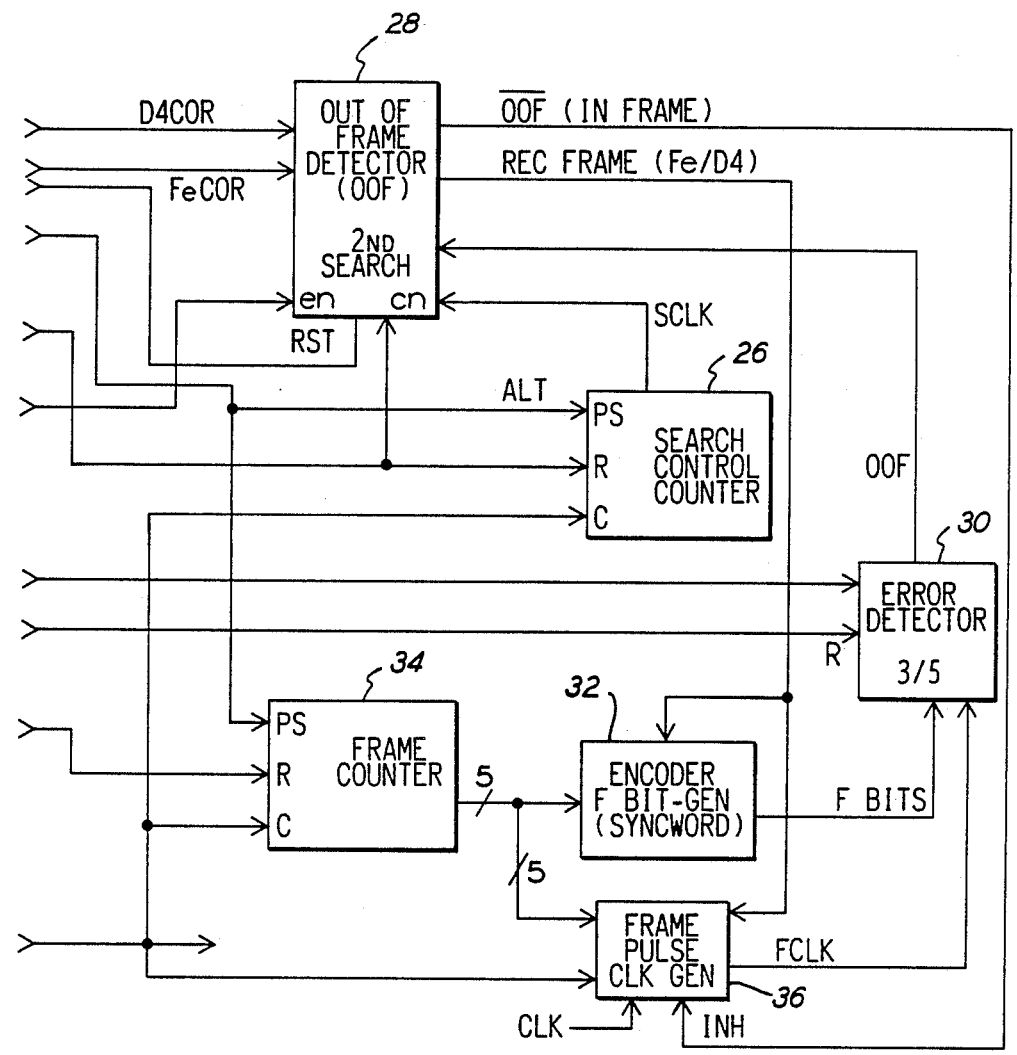
Figure 4:
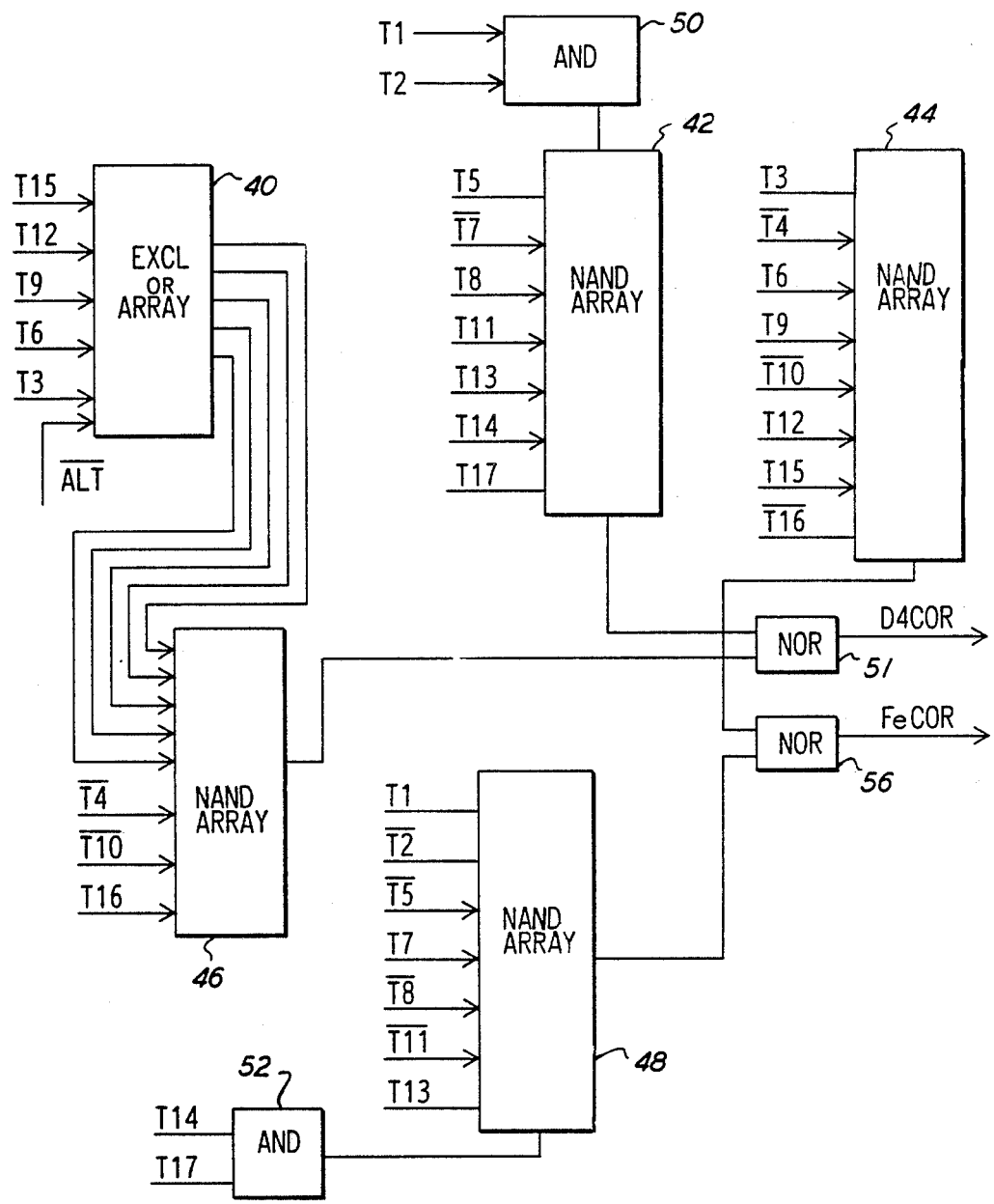

FIGS. 3A—3B is a more detailed block diagram of the frame synchronization system shown in FIG. 1; and FIG. 4 is a block diagram of the pattern decoder used in the system shown in FIG. 3.

Referring to FIG. 1 the DS1 data bit stream enters a sequencer 10 together with clock pulses which occur synchronously with the data. The sequencer is preferably a random access memory, counter, latch combination. The counter counts the clock bits and addresses the RAM which is connected in feedback relationship with the latch so as to present at the latch output a sequence of successive bits which are spaced apart by a particular spacing. In the case of the illustrated system, which is adapted to detect frame synchronization from DS1 data in D4 or Fe format, the bit spacing is preferably 772 bits or 4 frames of 193 bits each, and the taps T1 to T17 are 772 bits apart. The design of the sequencer may be of the type described in the above-referenced article and patent. The bit spacing, however is unique and provides the system with the ability for detecting frame synchronization whether the frame format is Fe or D4. This will become more apparent from FIG. 2.

FIG. 2 shows valid frame patterns for Fe and D4. Fe format involves a superframe of 24 frames, while D4 format involves 2 successive 12 frame superframes. The framing bits are inserted every fourth frame in Fe format or on frame 8, 12, 16, 20 and 24 as shown in FIG. 2. It will be observed that FIG. 2 shows three groups of superframes (SFR No. 1, 2 and 3). Not all of the frames of each superframe are shown, but only those which contain framing bits (superframe 1 of FIG. 2 is not shown entirely). These are the bits which will appear at the taps T1 to T17 of the sequencer 10 when a valid frame pattern for the Fe format appears at these taps.

The D4 format has 2 alternate subpatterns of valid framing bits. These are shown as the D4A0 and the D4 A1. The bit spacing for these patterns is also 4 frames apart for their frame bits. These frame bits will also appear in a sequence on the 17 taps. The location of the frames which contain these valid framing bits is also indicated in the column labelled Frame No. D4 Alt=0 and Alt=1. Based upon this discovery of two alternate subpatterns for the D4 valid frame patterns, simultaneous and in parallel detection of frame synchronization from both Fe and D4 patterns, whichever might appear, in the DS1 transmission is accomplished in the herein described system. Of course the DS1 carrier will never simultaneously contain both D4 and Fe formats. However the carrier may contain the framing patterns in accordance with either the Fe or D4 format. It is advantageous and sometimes required for network channel office equipment and facility monitor office equipment that either framing format be detected *without a priori knowledge* of the frame format which is contained in the DS1 data.

A valid frame pattern decoder 12 (FIG. 1) which is operative to decode either the D4 or Fe patterns is connected to the taps of the sequencer 10. This valid frame pattern decoder provides an output when either a D4 or Fe pattern is detected. The D4 pattern may either be Alt=0 or Alt=1. A decode controller and valid framing level detector 14 is connected to the valid frame pattern decoder 12 and controls the decoder so as to successively decode the alternate D4 patterns. Upon decoding of both alternate D4 patterns or an Fe pattern, a valid frame output is provided to a frame counter 16. The valid frame output (FV) synchronizes the frame counter which divides the system clock (which is contained in the DS1 data, i.e., 1.544 MHz) by 193 to produce a stream of output sync pulses which may be used for various purposes in the decoding, reframing or monitoring of the TDM bit stream. Specifically the sync pulses can be used for frame identification to permit decoding of the TDM data bytes.

The decode controller and valid framing level detector 14 includes facilities for first and second searches for valid frame patterns in order to provide an extended sequence of framing bits from which the frame sync signals can be decoded so as to obtain a low probability of false frame detection. Once frame sync has been found, the valid framing level detector 14 will compare the received synchronizing bits with the locally generated frame sync pulses on a frame bit by frame bit basis. And will command the decoder 12 to reinitiate search for valid frame patterns, if the ratio of invalid to valid frame bits exceeds a certain ratio (suitably three out of five). The data from which the data bits of the TDM transmission after a delay of 24 frames (one Fe or two D4 superframes) appears at tap 5 on the sequencer 10. This data may be used for retransmission or other purposes for DS1 carrier transmissions.

Referring to FIG. 3, there is shown the data and system clock inputted to the sequencer 10. There is also shown a flip flop which is responsive to the system clock and to the data from tap 5 of the sequencer for retiming the data for use in other parts of the DS1 transmission system.

The pattern decoder 12 provides two outputs when a valid sequence is detected. These are shown as D4COR and FeCOR (COR is an acronym for "correct"). It will be observed that either D4COR or FeCOR are detected and decoded when a sequence derived from almost three superframes or almost eight superframes of D4 data is decoded. The use of almost three superframes for Fe and almost eight superframes for D4 provides a low probability of the D4COR and FeCOR outputs being provided falsely. The probability of false framing is still further reduced by the use of a subsequent search in a sequence of 48 subsequently appearing framing (F) bits from a pattern starting 48 frames after the pattern which provided the initial D4COR and FeCOR outputs.

A search control logic circuit 20 conducts the first search in two sequences depending upon whether the D4COR and FeCOR outputs are produced. If neither D4COR or FeCOR appear the searching continues. If FeCOR appears, a maintenance output M is generated by the logic circuit and latched for further use. If the D4COR output appears without the FeCOR output, then the first search logic circuit 20 provides an output on the Alt line which conditions the decoder 12 to respond to the alternate D4 bit pattern. Whichever D4 pattern occurs and is detected first is arbitrary and does not affect the operation in the D4 pattern detection mode. Only after both alternate D4 patterns are detected (suitable memory being provided in the logic circuit 20), the maintenance or M output is provided. The system clock input (CLK) to the logic circuit 20 is provided for accurate timing and sampling of the detection of the D4COR and FeCOR outputs from the decoder 12 on a bit by bit basis.

When the M output appears the system reaches the maintenance mode. In so doing it provides an output to an inhibit input of the logic circuit 20, thereby disabling it.

The leading edge of the M output triggers a retiming circuit 22, which may include a one shot circuit, which provides a short pulse for resetting a sync generating counter 24 which divides the system clock pulses by 193. This sync generating counter 24 provides pulses coincident with the frame bits in the DS1 data bit stream which appear on either tap 5 or tap 17 which are relatively delayed by plural superframe times from each other. The frame sync pulses may then be used to determine the time for a second search after a predetermined delay, suitably 6 milliseconds or 48 frames.

This delay is measured by a search control counter 26 which counts the F sync pulses from the generator 24. This counter 26 is reset by the leading edge of the M output. In the event that the D4 format is detected, the ALT output is also provided to preset the search counter 26 so as to accommodate for the delay from the start of frame when the M pulse is produced after D4COR. After 48 frames are counted, the sample clock (SCLK) output pulse initiates a sampling of the D4COR and FeCOR outputs from the pattern decoder 12 in the out-of-frame detector logic circuit 28. This logic circuit 28 has already been enabled by the M pulse.

In the event that D4COR or FeCOR do not appear upon occurrence of SCLK, a reset pulse is generated which resets the first search logic circuit 20 thereby enabling it to reinitiate the search for valid frame patterns. Then the framer has returned to the search mode from the maintenance mode. If the detector 28 finds a D4COR or FeCOR output, a not OOF (In Frame) output is provided. The In Frame output is a flag which is set and signals that the framing system is in the frame sync mode providing usable F sync pulses. In this mode the system continues to provide valid frame sync pulses until a three out of five error detector 30 provides an output which signals the out-of-frame detector 28 to reset the search control logic circuit 20 thereby reinitiating the search mode.

The error detector 30 is a conventional ratio detector using digital logic which compares the received F bits by sampling the data bits from tap 17, upon occurrence of a sampling clock pulse (FCLK), with locally generated framing bits provided by an encoder 32. This encoder 32 functions as an F bit or sync word generator. The comparisons in the error detector 30 are made on an F bit by F bit basis.

When the maintenance mode is entered, a frame counter 34 is reset. A preset is applied from ALT to accommodate the slight delay upon occurrence of the D4COR output which results in the M bits. In other words, the frame counter 34 is reset in either of two states depending on whether the M outputs resulted from an FeCOR or D4COR output. The frame counter 34 is then in sync and the counting of the F sync pulses provides an exact frame count number on the parallel output lines (5 lines) from the frame counter 34. These 5 lines are encoded by the encoder 32 into the F bits coincident with the bits appearing at tap 17. The out-of-frame detector 28 provides a RECFRAM (Fe/D4) output to the encoder 32 and also to the frame pulse clock generator 36 so that these circuits 32 and 36 provide the F bits and F clock pulses appropriate for the respective Fe and D4 formats. Note that D4COR with Alt=0 is the same as Fe. D4COR with AlT 1 is *not*. See FIG. 2.

The error detector 30 then compares the frame bits from tap 17 with the locally generated F bits from the encoder 32 at the time of the F clock pulses. If the comparison is correct, the error detector does not provide an output which is effective to return the system to search. However if three out of any five sequential F bits from tap 17 do not agree with the locally generated F bits from the encoder 32, the error detector 30 provides an output pulse (off) to the out-of-frame detector 28, which returns the system to the search mode.

Referring to FIG. 4 there is shown the pattern detector 12. This detector is made out of an exclusive OR array 40 and four NAND gate arrays 42, 44, 46 and 48. There are also two AND gates 50 and 52 and two NOR gates 54 and 56 which provide the D4COR and FeCOR outputs respectively. The connections from the taps to the gates are indicated in FIG. 4. The exclusive OR array 40 is enabled by ALT to change the complement of taps which are applied to the third AND gate array 46 so as to decode the alternate D4 pattern.

From the foregoing description it will be apparent that there has been provided an improved frame synchronization system. While the system has been described in connection with frame synchronization of D4 and Fe formats of a DS1 carrier, it will be appreciated that the invention may be applied for the decoding of other formats while obtaining the same advantages of short frame acquisition time and low probability of false framing as well as minimization of the circuitry which is required to synchronize on any of a plurality of frame patterns. Accordingly the foregoing description should be taken as illustrative and not in a limiting sense.

I claim:

1. A system for detecting synchronizing signals from framing bits in any of a plurality of framing formats of time division multiplexed (TDM) digital signals which comprises means for providing from said digital signals sequences of bits which are spaced apart by a predetermined multiple of the number of bits in a frame, means operative for decoding said sequence in parallel to derive outputs simultaneously when said sequences correspond to certain framing bit patterns which correspond to different ones of said formats, and means responsive to said outputs for providing said synchronizing signals.

2. The system according to claim 1 wherein said decoding means has means for providing separate ones of said outputs upon detection of each of said bit patterns.

3. The system according to claim 2 further comprising means responsive to the output corresponding to one of said formats for operating said decoding means to decode a different framing bit pattern contained in said one format, and means operative for maintaining the output correspondent to said one format when said different framing bit pattern is decoded.

4. The system according to claim 3 further comprising means for sampling said outputs a predetermined time after the occurrence thereof for maintaining said synchronizing signals when at least one of said outputs is provided from the framing bit pattern from a subsequently occurring sequence of said frames.

5. The system according to claim 4 wherein said time division multiplex signals are in DS1 format and said plurality of formats are the extended superframe format (Fe) of cyclic series of 24 frames and the D4 format of cyclic series of 12 frames.

6. The system according to claim 5 wherein said predetermined multiple is four and the number of bits in each of said frames is 193.

7. The system according to claim 1 wherein said means for providing said sequences is operative to provide a single repetitive sequence which changes upon occurrence of each successive bit of TDM signals, and said decoding means is responsive to said single repetitive sequence.

8. The system according to claim 6 wherein said one of said formats is the D4 format and said different framing bit pattern is detected from framing bits two frames away from the other of said framing bit patterns of said D4 format.

9. The system according to claim 1 further comprising means responsive to said outputs for locally; generating from a means for deriving from said means for providing from said TDM signals said sequences of bits said framing bits in said TDM signals, and means for inhibiting said means responsive to said outputs for providing said synchronizing signals when the ratio of the number of locally generated framing bits and the framing bits derived from said TDM signals which do not agree in a sequence of a certain number of framing bits exceeds a certain level.

10. The system according to claim 9 wherein said level is three of said locally generated framing bits which do not agree with said framing bits derived from said TDM signals out of five sequential framing bits.

11. The system according to claim 1 wherein said means responsive to said outputs for providing said synchronizing signals comprises means for carrying out a first search of said sequences for said outputs which is operative to derive a first signal when said outputs are detected, and means responsive to said first signal for conducting a second search for said outputs after the occurrence of a predetermined number of said frames of said TDM signal for verifying the occurrence thereof and enabling said first signal to continue to be provided, said synchronizing signal providing means being responsive to said first signal.

12. The system according to claim 11 wherein said synchronizing signals providing means includes a counter which divides by the number of bits in a frame, and means for synchronizing said counter in response to the occurrence of said first signal.

13. The system according to claim 5 wherein the said decoding means includes means for providing said outputs when both said D4 and Fe formats occur simultaneously.

* * * * *